Patented June 20, 1933

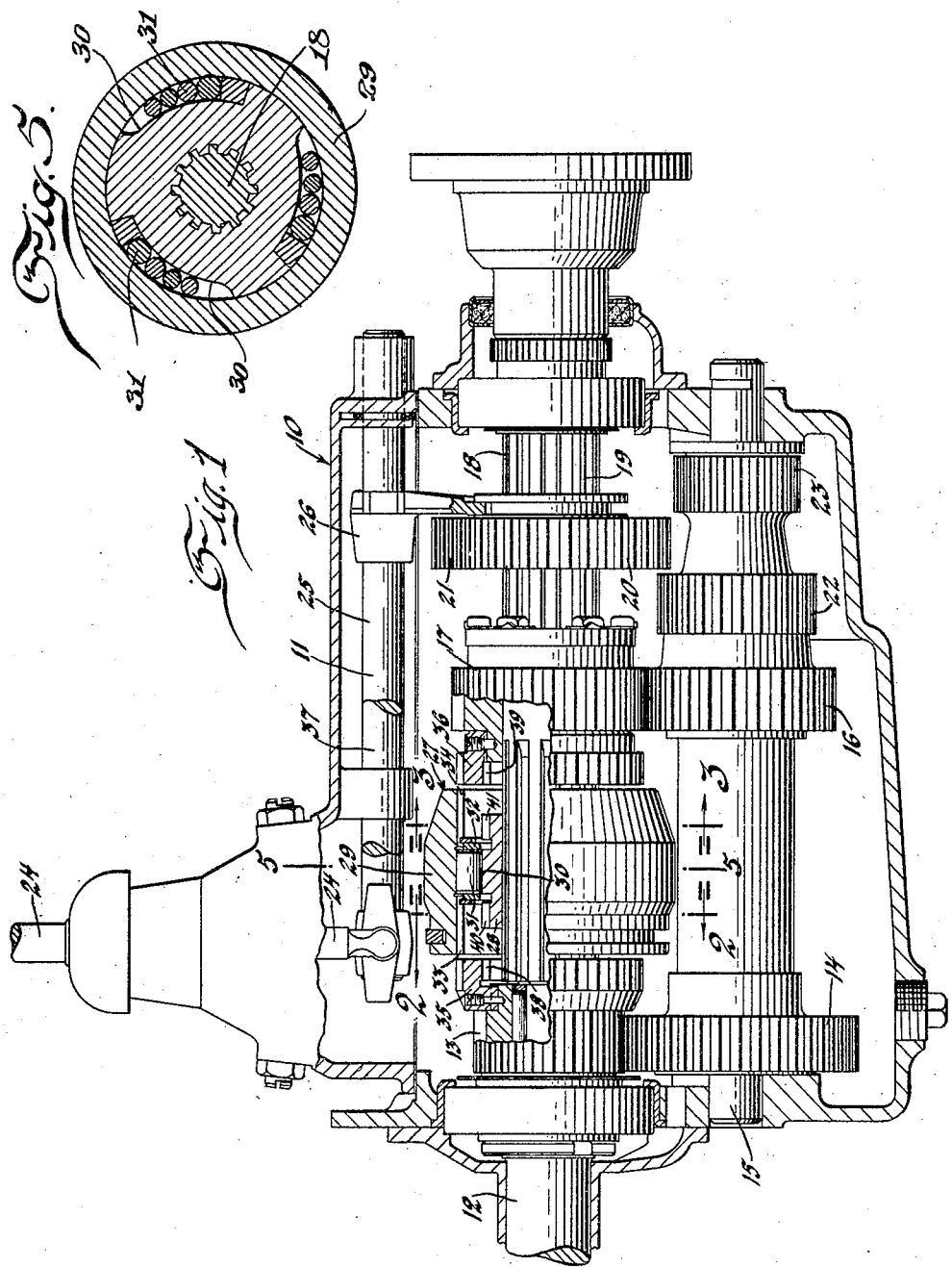

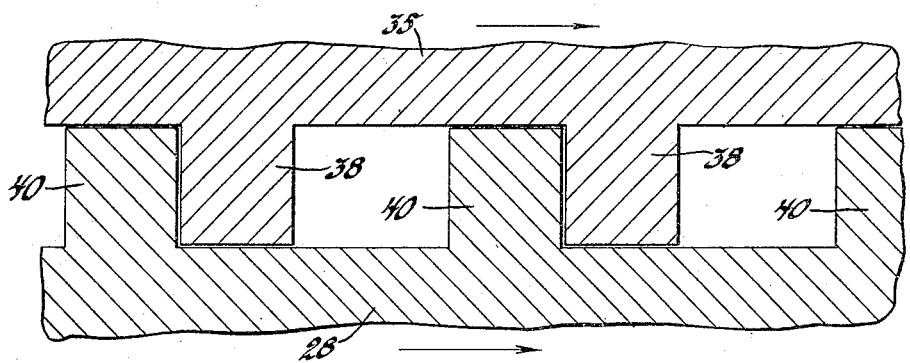
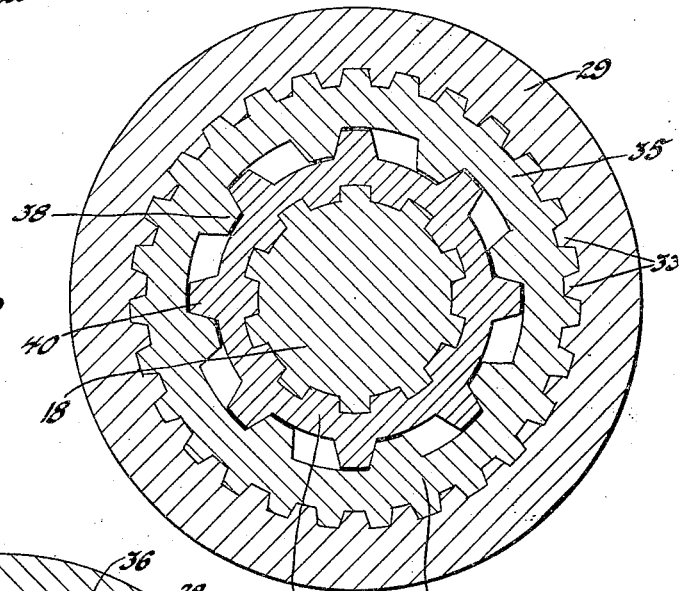
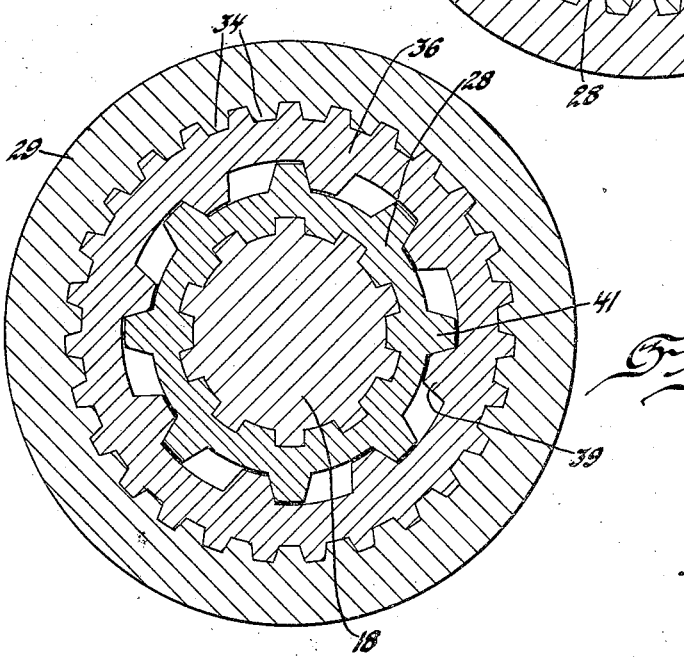

1,914,537

UNITED STATES PATENT OFFICE

HADLEY SMITH, OF ROYAL OAK, MICHIGAN, ASSIGNOR TO HUPP MOTOR CAR CORPORATION, OF DETROIT, MICHIGAN, A CORPORATION OF VIRGINIA

CLUTCH MECHANISM FOR TRANSMISSION GEARING

Application filed August 17, 1931. Serial No. 557,677.

This invention relates generally to variable speed transmissions and refers more particularly to selective speed gearing of the type having cooperating engaging toothed elements.

One of the principal objects of this invention is to improve generally selective change speed gearing by providing an arrangement which materially facilitates intermeshing of cooperating toothed elements and in addition, minimizes any tendency for the toothed elements to accidentally disengage.

The foregoing as well as other objects will be made more apparent as this description proceeds, especially when considered in connection with the accompanying drawings, wherein:

Figure 1 is a central sectional view through a transmission embodying change speed gearing constructed in accordance with this invention;

Figures 2 and 3 are cross-sectional views taken substantially on the lines 2—2 and 3—3, respectively, of Figure 1 of the drawings showing the clutch member in both of its operative positions;

Figure 4 is a diagrammatic sectional fragmentary development of a pair of cooperating engaging clutch members.

Figure 5 is a cross sectional view taken substantially on the line 5—5 of Figure 1.

Although the invention is not necessarily so limited, it finds particular utility when employed in a selective gear free wheeling transmission of the type illustrated generally by the reference character 10 in Figure 1. The transmission 10 selected herein for the purpose of illustration is of a well known commercially accepted design and comprises in general a case 11 having a drive shaft 12 journaled in any suitable manner in the front wall thereof and extending from the main clutch (not shown) of the power plant to a point within the case. The portion of the shaft 12 extending within the case is provided with a plurality of gear teeth 13 arranged in constant mesh with a suitable gear 14 fixed to a countershaft 15 having the opposite ends thereof suitably journaled within the end walls of the case. Beside the gear 14, the countershaft 15 has also secured thereto a second speed gear 16 having teeth arranged in constant mesh with corresponding teeth upon a cooperating second speed gear 17 rotatably mounted on a driven or transmission shaft 18. The transmission shaft 18 is supported within the case in axial alignment with the drive shaft 12 and serves to transmit power from the latter shaft to a propeller shaft (not shown).

The portion of the transmission shaft in rear of the second speed gear 17 is suitably splined as at 19 for slidably receiving a low speed gear 20 having peripheral teeth 21 operable upon forward sliding movement of the low speed gear axially of the transmission shaft to mesh with a corresponding low speed gear 22 on the countershaft and operable upon rearward sliding movement to mesh with a suitable reverse idler (not shown) which in turn meshes with a reverse gear 23 formed on the countershaft. Sliding movement of the low speed gear 20 in the direction specified above is effected in the conventional manner by means of a shifter lever 24 and a slidable rail 25 operatively connected to the low speed gear by means of the yoke 26.

Mounted upon the transmission shaft intermediate the gears 13 and 17 for axial sliding movement relative thereto is suitable overrunning clutch mechanism 27. In the present instance the clutch 27 is illustrated herein as being of the roller type and comprising inner and outer complementary sections 28 and 29, respectively. The inner member 28 is splined on the transmission shaft for sliding movement axially thereof and is provided with an intermediate peripheral portion having a plurality of cam faces 30 formed thereon with which the rollers 31 engage. The cam faces are fashioned to wedge the rollers between the adjacent surfaces of the inner and outer sections to cause rotation of the latter as a unit when the outer section 29 is transferring torque from the motor to the inner section 28 or when the angular velocity of the two sections is the same. On the other hand, the construction is such as to permit the inner section 28 to overrun or travel independently of the outer section 29 when the speed of rotation of the transmission shaft or inner section 28 exceeds that of the outer section. The rollers 31 are held in position between the inner and outer clutch sections by means of suitable end thrust plates 32 arranged on opposite sides of the rollers.

The outer section 29 of the clutch is provided at opposite ends thereof with two sets of internal teeth 33 and 34 adapted to respectively mesh with suitable clutch elements 35 and 36 fixed to the gears 13 and 17, respectively. The arrangement is such that movement of the overrunning clutch forwardly causes the teeth 33 on the outer section 29 to mesh with the teeth on the clutch element 35 to produce a direct drive while movement of the clutch 27 rearwardly effects engagement of the teeth 34 with the clutch element 36 to accomplish an intermediate speed through the second speed gearing 17 and 16. Both sets of teeth 33 and 34 being on the outer section 29 of the clutch, it will be apparent that in either of the above-mentioned positions of the clutch 27 the inner section 28 of the latter is driven indirectly from the outer section through the rollers 31. In other words, the construction is such that when the transmission is in either direct or second speed positions, the driven shaft will be permitted to overrun the drive shaft in the event that the speed of rotation thereof exceeds that of the drive shaft. Movement of the overrunning clutch to the aforesaid positions is effected through the medium of the shifter lever 24 and a second shifter rail 37 operatively connected in any suitable manner to the outer section 29 of the overrunning clutch.

While it is well established in the trade that the above construction provides for materially facilitating shifting of the transmission from second to high or vice versa owing to the ability of the section 28 of the clutch to overrun, nevertheless, it is frequently desirable to positively connect the direct drive and second speed gears to the driven shaft so as to permit utilizing the motor as a brake. The foregoing is accomplished herein by providing internal teeth 38 and 39 respectively on the clutch elements 35 and 36 adapted to alternately mesh with corresponding teeth 40 and 41 arranged respectively on opposite sides of the splined section 28 of the clutch. As will be observed from Figure 1, the teeth 40 and 41 are so arranged with respect to the teeth 33 and 34 as to permit shifting the same into intermeshing relationship with the teeth 38 or 39 from free wheeling positions. In other words, the arrangement is such that initial movement of the clutch in either direction causes the teeth 33 and 34 to mesh with the clutch members 35 or 36 and continued movement of the clutch in either direction causes the teeth 38 or 39 to mesh with the teeth 40 or 41 to effect a positive driving connection in both directions between the drive and driven shafts.

In transmissions of the foregoing type now commercially produced, considerable difficulty has been encountered in providing a construction which permits efficiently and expediently moving the splined section of the clutch into positive mesh with either of the aforesaid gears and at the same time prevent the interengaging teeth on the splined part of the clutch and gears from accidentally disengaging. In an effort to secure the foregoing advantageous features constructions have been presented wherein alternate teeth of each of the series 38, 39, 40 and 41 have the adjacent ends relieved so as to facilitate initial intermeshing of the same. While relieving the teeth as indicated serves to a limited degree in facilitating initial engagement of the teeth, nevertheless, it is extremely objectionable in an arrangement of the character specified herein since there is a predominating tendency of the operator, when shifting into positive mesh, to discontinue movement of the splined section 28 of the clutch when the teeth thereon are merely partially engaged with the cooperating teeth. In other words, it is frequently the case that when shifting the splined section of the clutch, the corresponding short teeth upon the latter and cooperating gear abut each other offering an obstruction to further sliding movement of the clutch giving the operator the impression that he has moved the clutch to its fullest extent whereas actually only the relatively long teeth of the gears are in engagement. When such a condition exists, it is obvious that only a relatively small portion of the longer teeth are utilized to take the full torque, with the result that in a very short time the ends of the longer teeth are rounded off due to wear which is objectionable since it is responsible to a large degree in causing accidental disengagement of the teeth even when the same are in proper intermeshing relations.

The foregoing difficulties are avoided in the present instance by eliminating the relatively short teeth on the clutch part 28 and elements 35 and 36 or in other words, by cutting away alternate teeth on the aforesaid members so as to provide interdental spaces of greater thickness than the teeth themselves. This construction is clearly shown in Figures 2 and 3 of the drawings and it is believed obvious that it not only provides for facilitating engagement of the teeth on the splined clutch member with either of the elements 35 and 36, but also insures completely engaging the desired teeth so that there will be no tendency of the end portions of the same to round off and cause accidental disengagement of the clutch members.

While at first glance it may appear that the above construction would provide an appreciable amount of backlash between the interengaging members, nevertheless, such is not the case in the present combination due to the operation of the overrunning clutch. For explanatory purposes, let it be assumed that the overrunning clutch 27 is in second speed position and it is desired to drive the driven shaft directly from the drive shaft. The foregoing is accomplished in the present instance by merely moving the clutch forwardly upon the driven shaft so as to intermesh the teeth 33 on the section 29 with the teeth on the element 35. As previously stated, when the overrunning clutch is in the above position, overrunning of the driven shaft will be permitted under the momentum of the same. Assuming now, however, that it is desired to effect a positive connection in both directions between the driving and driven shafts, the main clutch (not shown) is released so as to disconnect the driving shaft from the prime mover and the overrunning clutch is moved still farther forward so as to engage the teeth 40 thereon with the teeth 38 on the element 35. As previously stated, this engagement is materially facilitated and unobstructed owing to the width of the interdental spaces between the teeth. When the main clutch is released preparatory to effecting a driving engagement between the splined section 28 of the clutch and the direct drive element 35, the speed of rotation of the latter becomes materially less than the speed of rotation of the splined clutch section 28 so that upon initially intermeshing the teeth 38 and 40, the latter teeth will engage the former substantially throughout the length thereof. When engagement of the teeth 38 and 40 is accomplished, the main clutch is engaged and the speed of the prime mover generally increased, with the result that the teeth 38 tend to travel away from the teeth 40. Appreciable relative movement of the teeth 38 and 40, however, is prevented by the overrunning clutch since the section 29 thereof is also arranged in interlocking engagement with the clutch element 35 so that any movement of the latter relative to the splined clutch part 28 will necessarily effect a movement of the clutch part 29 relative to the section 28 thereof in a direction to wedge the rollers 31 into engagement with the cams on the latter section. In other words, any attempt of the clutch element 35 to move relative to the splined clutch section 28 to cause separation of the teeth 38 and 40 will effect a relative movement between the inner and outer clutch sections in a direction to wedge the rollers 31 therebetween. Thus, it will be apparent that the distance the teeth 38 move away from the teeth 40 is materially restricted and corresponds to the distance of relative movement of the two clutch sections necessary to provide a locking engagement therebetween through the rollers. Accordingly, the degree of relative movement in actual practice is very slight being less than one sixty-fourth of an inch. The same principle of operation is true when positively engaging the splined clutch member 28 with the teeth 39 on the second speed clutch element 36.

Thus, from the foregoing it will be apparent that in the two-way driving position of the inner clutch section 28, the full torque or load is transmitted through the overrunning clutch instead of through the intermeshing gear teeth. Owing to the slight relative movement between the overrunning clutch parts necessary to wedge the rollers therebetween, the teeth 38 and 40 actually move slightly relative to each other as indicated in Figure 4 with the result that a decrease in engine speed will cause the momentum of the driven shaft to engage the teeth 40 thereon with the teeth 38. The arrangement is such that when the engine is being used as a brake, the torque is taken through the teeth 38 and 40 or through the teeth 39 and 41 depending upon which set of teeth is in operation. Engagement of the cooperating teeth upon decreasing the motor speed does not produce a noticeable clash in the present instance owing to the relatively slight space existing between the two teeth and due to the fact that engagement of the teeth is accomplished gradually due perhaps to the elasticity of the overrunning clutch and associated gearing.

What I claim as my invention is:

1. In transmission gearing, the combination with a rotatable clutch element having two sets of teeth, of an overrunning clutch movable toward and away from said element and comprising, cooperating sections, ratchet means establishing a driving connection between said sections permitting overrun of one of the latter, each of said sections having a series of teeth for respectively meshing with the sets of teeth on said clutch element upon movement of the clutch in one direction, the teeth on one of said sections and the cooperating set of teeth on said clutch element having interdental spaces greater than the thickness of the teeth themselves and so determined that the teeth on the other section drives the first-mentioned section from the other of said sets of teeth on the clutch element aforesaid upon rotation of the latter at a greater speed than the first-named section.

2. In transmission gearing, the combination with driving and driven shafts, of a clutch element fixed to the driving shaft having spaced inner and outer sets of teeth, an overrunning clutch slidably mounted upon the driven shaft for movement toward and away from the element, said clutch comprising, a section splined upon the driven shaft, another section encircling the splined section and ratchet means between the sections for driving the splined section from the outer section and for permitting overrun of the splined section, a set of teeth on the splined section and a set of teeth on the other section, said sets of teeth respectively meshing with the inner and outer sets of teeth on said first-mentioned clutch element upon movement of the overrunning clutch toward the said element, the set of teeth on said splined section and the cooperating inner set of teeth on said clutch element having interdental spaces throughout the length thereof greater than the thickness of the teeth themselves and so determined that the set of teeth on the other of said overrunning clutch sections drives the splined section through the ratchet means from the outer set of teeth on said clutch element when torque is transmitted from the driving shaft to the driven shaft.

3. In transmission gearing, the combination with a driving clutch element having spaced sets of teeth, of an overrunning clutch movable toward and away from said element, said clutch comprising cooperating relatively rotatable sections, and means for rotating the sections as a unit in one direction operable to permit overrun of one of the sections upon rotation of the latter at a greater speed than the other section, a set of teeth on each of said sections respectively meshing with the sets of teeth on the clutch element upon movement of the overrunning clutch in one direction, the set of teeth on said overrunning section and the cooperating set of teeth on said clutch element having interdental spaces greater than the thickness of the teeth throughout the length of the latter and so determined that the set of teeth on the other of said section drives the overrunning section through the means aforesaid and from the other of said sets of teeth on the clutch element when torque is transmitted from the latter to the overrunning section.

4. In transmission gearing, the combination with driving and driven members, of a clutch element fixed to the one of said members and having spaced sets of teeth, an overrunning clutch movable toward and away from the clutch element and comprising, a section splined upon the other of said members and having a set of teeth adapted to mesh with one of the sets of teeth on said element to effect a positive driving connection between said members, a second cooperating section having a set of teeth meshing with the other of said sets of teeth on the element, the set of teeth on the splined section and the cooperating set of teeth on said clutch element having interdental spaces throughout the length thereof greater than the thickness of the teeth, and means associated with said sections permitting overrunning of said splined section in one direction only and operable to drive the latter section from the cooperating interengaging teeth on said second section and clutch element when torque is transmitted from the latter to the splined section.

5. In a power transmitting unit, the combination with driving and driven elements, of a clutch member non-rotatably fixed relative to the driving element and having two sets of clutch teeth, a second clutch member of the overrunning type having a section non-rotatably fixed relative to the driven element and having a second section mounted for rotation relative to the first section, means providing for relative axial movement of said clutch members toward and away from each other, a set of clutch teeth on the second section fashioned to mesh with one of the sets of clutch teeth on said first named clutch member upon initial relative axial movement of the members toward each other, a set of teeth on the first clutch section fashioned to mesh with the other set of teeth on the first named clutch member upon continued relative movement of the clutch members toward each other, the latter sets of teeth having interdental spaces greater than the circumferential extent of the teeth facilitating intermeshing of the same, and means operable in the first named relative positions of the clutch members to drive the first section from the second section and to permit the former to overrun the latter, said latter means also operable in the other of the aforesaid relative positions of the clutch members to drive the first section when torque is transmitted from the drive to the driven elements and to transmit the load on the latter sets of intermeshing teeth when the speed of the driven element tends to exceed the speed of rotation of the driving element.

In testimony whereof I affix my signature.

HADLEY SMITH.